United States Patent Office 2,885,004
Patented May 5, 1959

2,885,004

TREATMENT OF WELLS

Robert O. Perry, Tulsa, Okla., assignor to Sinclair Oil & Gas Company, Tulsa, Okla., a corporation of Maine No Drawing. Application November 2, 1955
Serial No. 544,596

3 Claims. (Cl. 166—42)

This invention relates to a three stage method of acidizing wells drilled in sandstone formations. In a particular aspect, this invention relates to a three stage method of acidizing water intake wells drilled in sandstone formations whereby high permeability is effected in areas of low permeability.

It is common knowledge that one of the major problems in the production of oil is increasing recovery of oil after primary flow and pumping methods are exhausted. Increased oil recovery is frequently attempted by secondary methods carried out by pumping water under pressure into an input well to drive additional oil into adjacent output wells for recovery. One of the disadvantages of this method is that there is almost always some type of filter cake or tight sands which lower the permeability of the formation and thus interfere with the movement of the water drive. Consequently, in an effort to overcome this problem, various methods of acidization have been proposed for increasing water intake rates in secondary recovery operations, particularly where the producing formation consists largely of sandstone or other siliceous rock. Generally, these procedures consist in introducing into the geological formation a fluid reagent such as hydrochloric acid or hydrofluoric acid, either alone or in combination, for the purpose of causing the acid to dissolve the siliceous structure of the well and thereby open up the well formation. In U.S. Patent No. 2,367,350, there is disclosed a method of increasing the permeability of a geological formation containing both silicates and carbonates by first treating the formation with hydrochloric acid and then injecting a mixture of hydrochloric acid and hydrofluoric acid, the theory being that the initial hydrochloric acid pretreatment eliminates the formation of precipitates which otherwise would be produced by the reaction of hydrofluoric acid on carbonates. Similarly, U.S. Patent No. 2,225,695 discloses a method of opening sandstone formations by treating the well first with hydrofluoric acid to attack the siliceous material and then treating with hydrochloric acid to dissolve the silicic acid and other gelatinous reaction products resulting from the hydrofluoric acid treatment. While these methods and various other modifications have shown favorable results in some instances, in many others they have not effectively increased the permeability of siliceous formations so that a sufficient amount of water may be injected injected into the desired strata.

I have discovered an improved method for the treatment of wells penetrating sandstone formations, particularly water input wells on secondary recovery projects, by means of a three-stage method which consists essentially of contacting the strata with hydrochloric acid of defined concentration prior to and following the treatment of the formation with a mixed acid solution consisting essentially of hydrochloric acid and hydrofluoric acid of specified strengths. By the method of my invention, I have found that a permanent change in the permeability of the well is effected and that increased water intake rates may be employed in secondary recovery methods to drive additional oil from the retaining sands through output wells. In my method it is essential that each of the three acid treating steps be employed as they are interdependent in increasing the permeability of certain strata where other methods of acidizing are not effective. My method is particularly useful for treating a plugged sandstone strata in conjunction with a water drive operation although it is applicable to treating input wells before the water drive is begun and to treating any other sandstone formation.

The process of my invention will be illustrated by reference to the following three-stage acidizing procedure carried out in a sandstone formation where primary methods of recovery had been abandoned and secondary methods including water flooding had been practiced to decrease the permeability of the input well strata.

A cased well drilled to sandstone at a depth of 730 feet was provided with 715 feet of a ⅜ inch Saran acid injection line inside and projecting from the well tubing and a packer was set at 680 feet around and near the end of the well tubing. The Saran line weighted 2.5 pounds per hundred feet and the bottom 27 feet of the line were perforated to facilitate distribution of acid. A four foot, one-half inch lead filled pipe weighing 12 pounds was spliced to the bottom end of the line in order to counteract vertical forces against its entry.

For treating the well in accordance with the invention, 52 gallons of concentrated muriatic acid were pumped into the well over a period of four hours. Water of dilution was passed down the well tubing to provide a final acid concentration of 5 percent by volume contacting and passing into the strata. The original intake rate prior to acid injection was 43 barrels per day at 390 p.s.i. and after the acid treatment the rate dropped to 36 barrels per day at a pressure of 335 p.s.i. The acid was allowed to remain in position until its reaction with the sandstone formation was complete and a second acid charge was then injected.

The second charge consisted of 104 gallons of hydrochloric acid and 35.5 gallons of hydrofluoric acid, both acids having a final acid concentration of 5 percent by volume when mixed with separately passed water of dilution. A maximum intake rate of 67.4 barrels per day at 400 p.s.i. was obtained after nine hours of treatment. The input rate started to decline and after 11 hours the hydrofluoric acid injection was stopped. The rate continued to decline and the hydrochloric acid injection was stopped after fourteen and one-half hours, the input rate having declined to as low as 51 barrels per day at 400 p.s.i. Ten hours later the well was opened and the Saran tube removed. The well was allowed to backflow for about 30 minutes and then "shut-in." Four hours later the input rate increased to 67 barrels per day and thereafter leveled to a rate of 66.6 barrels per day five days later. The well was then acidized with a third treatment of acid consisting of a 5 percent solution of hydrochloric acid. Prior to final acidization the intake rate of the well was 62.5 barrels per day at a wellhead pressure of 420 p.s.i. 33.6 gallons of hydrochloric acid were then injected into the formation and the rate increased to 74.5 barrels per day at a pressure of 428 p.s.i. A maximum input rate of 94.5 barrels per day at 460 p.s.i. was obtained in four hours and treatment was stopped one hour later after having injected a total of 65 gallons of acid, the input rate being 86.5 barrels per day at a pressure of 462 p.s.i. The well was allowed to stabilize and twenty four hours later a final rate of 93 barrels per day at 455 p.s.i. was obtained.

In carrying out the process of my invention, a water solution containing 2 to 10 percent by volume of hydrochloric acid may be used in the initial stage of the operation, a preferred concentration being about 3 to 6 percent. Higher acid concentrations are avoided since the acid solution in contact with cementitious materials, such as clay, carbonates and silicates, causes them to swell and obstruct the capillaries in the formation. In the second stage treatment the mixed acid solution will contain about 3 to 10 percent, preferably 5 to 8 percent, of hydrochloric acid and 3 to 6 percent hydrofluoric acid, a preferred concentration for the hydrofluoric acid being about 5 per cent. In the third stage treatment, the acidization is carried out in substantially the same manner previously described for the initial hydrochloric acid treatment i.e. by injecting an aqueous solution of hydrochloric acid of 2 to 10 percent concentration, preferably about 3 to 6 percent, against the well strata. In applying the process of my invention, the partially depleted formation may have been subjected to conventional water drive in which instance the existing pattern of input wells may be employed. Usually, a 5 spot or 9 spot pattern is adopted in order to promote uniformity of flow and reduce drive distances. The input well is treated under regular input pressure and the dilute acids can be pumped directly into the acid injection pipe at the well head. During each stage of the treatment, the acidization is carried out until the input rate has leveled out or until the desired rate is obtained. In order that the hydrochloric acid or the mixture of hydrochloric acid and hydrofluoric acid penetrate only sand formations containing oil and gas, the acid is introduced through a small plastic tube made of Saran or polystyrene which is lowered within the regular input pipe to the bottom of the well or the desired area. Particularly in this method, water of dilution is passed down the casing or well tubing.

The process of my invention will be further illustrated by reference to the following data developed on actual sand cores obtained from sandstone formations on secondary recovery projects. In each of the following examples a cylindrical core sample was taken and permeability determined by conventional apparatus consisting of means for holding the core and means for forcing the fluid therethrough at various pressures and temperatures. Examples V and VI illustrate the method of acidizing sandstone formations in accordance with the present invention and Examples I to IV, inclusive, represent typical acidizing procedures.

*Example I*

A core sample from the interval of 525.0 feet to 525.4 feet taken from an input well had the following physical characteristics:

| | |
|---|---|
| Length _____cm__ | 11.4 |
| O.D. _____cm__ | 12.0 |
| I.D. _____cm__ | 2.54 |
| Core volume _____cc__ | 1220 |
| Pore volume (with 20% porosity) _____cc__ | 244 |

The core was flooded with tap water to obtain a base line permeability and then with a 3% solution of hydrochloric acid. After flooding through 5.75 pore volumes of 3% hydrochloric acid, the feed was changed to tap water. The following data show the results of the test when plotting pore volume against permeability.

| Feed | Pore Volume | Permeability (millidarcies) |
|---|---|---|
| Tap Water | 11.5 | .88 |
| 3% Hydrochloric acid | 5.75 | 1.90 |
| Tap Water | 6.4 | 1.01 |

In this test there was little permanent increase with a 3% hydrochloric acid treatment.

*Example II*

Two cores from the upper Spraberry formation were selected for this test. The cores, designated A and B, were taken from intervals of 7237.5 feet and 7185.1 feet, respectively, and had the following physical characteristics:

| | Core A | Core B |
|---|---|---|
| Length_____centimeters__ | 7.50 | 7.15 |
| Diameter_____do____ | 5.06 | 5.06 |
| Diameter of Hole_____do____ | 1.26 | 1.26 |
| Volume of core_____cubic centimeters__ | 142.5 | 135.9 |
| Pore Volume_____do____ | 15.7 | 14.95 |
| Permeability_____millidarcy__ | .66 | .37 |
| Porosity_____percent__ | 11.0 | 11.0 |

The cores were put under flood with 50,000 p.p.m. brine and after 5 hours the permeability of Core A was 0.155 millidarcy and 0.1025 for Core B. The flood was changed to 2% hydrochloric acid and 3% hydrofluoric acid in 50,000 p.p.m. of brine and the permeability checked every ten minutes. The flow declined rapidly and after 80 minutes had dropped to .0036 millidarcy on Core A and .0038 millidarcy on Core B. The test was shut down over night and next morning an attempt was made to establish a flow with 50,000 p.p.m. brine. There was no flow. The total through-put was 20.5 cc. for Core A, and 13 cc. for Core B. The test was stopped and the cores examined. Except for a very shallow penetration of about 1 mm. of bleaching there was no change in the physical appearance of the samples.

*Example III*

A core sample taken from the interval of 7180.5 feet in the upper Spraberry formation had the following physical characteristics:

| | Percent |
|---|---|
| Length _____cm__ | 7.05 |
| Diameter _____cm__ | 5.06 |
| Diameter of hole _____cm__ | 1.26 |
| Volume of core _____cc__ | 132.8 |
| Pore volume _____cc__ | 15.5 |
| Permeability _____mdcys__ | 0.32 |
| Porosity _____ | 11.7 |

The core was put under flood with 50,000 p.p.m. brine until permeability was steady at 0.177 millidarcy. The feed was changed to 3% hydrofluoric acid in 50,000 p.p.m. brine and the permeability checked every ten minutes. After 90 minutes the flow had declined to .0037 millidarcy. The test was stopped and the core examined. There was no change in the physical appearance of the sample.

*Example IV*

A core sample from the interval of 524.6 to 525.0 feet from the input well of Example I had the following physical characteristics:

| | |
|---|---|
| Length _____cm__ | 11.5 |
| O.D. _____cm__ | 12.0 |
| I.D. _____cm__ | 1.3 |
| Core Volume _____cc__ | 1284 |
| Pore volume (with 20% porosity) _____cc__ | 257 |

In this test the core was flooded with tap water and then with flood "B" injection water to obtain a base line permeability. The core was then put under flood with 3% hydrochloric acid, a mixed acid solution of 3% hydrochloric acid and 3% hydrofluoric acid, and last with 3% hydrochloric acid. A final flood with flood "B" injection water was made to determine the increase in permeability. The following data show permeability plotted against pore volume when acidizing in accordance with the above procedure.

| Feed | Pore Volumes | Permeability (millidarcies) |
|---|---|---|
| Tap Water | 27.2 | .6 |
| Flood "B" Water | 6.0 | .67 |
| 3% Muriatic Acid in Flood "B" Water | 7.2 | 2.70 |
| 3% Muriatic Acid and 3% HF in Flood "B" Water | 7.2 | 10.42 |
| 3% Muriatic Acid in Flood "B" Water | 5.6 | 12.50 |
| Tap Water | 6.8 | 10.50 |

In the final flood with tap water there was a permanent increase in permeability of 17.1 times greater than the original base line permeability of .6.

*Example V*

A sandstone core selected from an interval of 632 feet had the following physical characteristics:

| | | |
|---|---|---|
| Weight | grams | 1078.25 |
| Diameter | cm | 9.50 |
| Diameter of hole | cm | 1.30 |
| Length | cm | 7.45 |

To establish a base line permeability the core was first put under fresh water flood and in 24 hours the permeabiltiy reached 8.1 millidarcies. The feed was changed to brine (50,000 p.p.m. NaCl) and after 19 hours the permeability reached 3.07 millidarcies. The core was then treated in accordance with the three stage method previously discussed in Example IV using a 3% solution of each reagent. The following data show the results of the test when plotting permeability against time.

| Feed | Time (Hours) | Permeability (millidarcies) |
|---|---|---|
| 3.07% hydrochloric acid in brine [1] | 72 | 4.42 |
| 3.07% hydrochloric acid and 3.05% hydrofluoric acid in brine [1] | 30 | 28.2 |
| 3% hydrochloric acid in brine [1] | 15 | 75.5 |

[1] The brine contained 50,000 p.p.m. of NaCl.

Inspection of the core revealed that it had retained its shape and was soft enough to be penetrated with a knife.

I claim:

1. A three-stage method of acidizing wells drilled in sandstone formations to increase the permeability thereof, comprising the steps of contacting said formation with a first solution of hydrochloric acid of about 2 to 10 percent strength and allowing the acid to react with the sandstone formation; contacting said formation with a second acid solution of hydrochloric acid of about 3 to 10 percent strength and hydrofluoric acid of about 3 to 6 percent strength, and allowing the second acid solution to react with the sandstone formation until the permeability of the formation is increased; and thereafter contacting said formation with a third acid solution of hydrochloric acid of about 2 to 10 percent strength and allowing the third acid solution to react with the sandstone formation.

2. The method in accordance with claim 1 wherein the sandstone well is an input well in which the permeability has been decreased by the effect of water injection.

3. The method of claim 2 wherein said first and third solutions are hydrochloric acid of about 3 to 6 percent strength and said second solution contains hydrochloric acid of about 5 to 8 percent strentgh and hydrofluoric acid of about 3 to 6 percent.

References Cited in the file of this patent

UNITED STATES PATENTS

| 2,225,695 | Henderson | Dec. 24, 1940 |
| 2,367,350 | Heigl | Jan. 16, 1945 |